3,214,279
NOVEL COATING COMPOSITION
Fremont L. Scott, Scotch Plains, N.J., assignor, by mesne assignments, to M & T Chemicals Inc., New York, N.Y., a corporation of Delaware
No Drawing. Filed June 9, 1961, Ser. No. 115,941
10 Claims. (Cl. 106—15)

This invention relates to a novel protective coating. More specifically, it relates to a paint characterized by its anti-fouling properties.

As is well known to those skilled in the art, surfaces which are exposed for extended periods of time to marine conditions are highly susceptible to fouling. Metal or wood surfaces, including boat bottoms, marine structures including piers, docks, etc. become coated with a wide variety of undesirable marine organisms with the result that maintenance of the structure becomes difficult. In the case of boat bottoms, the fouling may result in a decreased ability to attain desired speed or to otherwise maneuver.

Fouling of ship bottoms and other similar surfaces may arise because of the presence of various marine organisms including algae, barnacles, tubeworms, hydroids, oysters, brozoans, tunicates, etc. These organisms may attach themselves to the surface and build up substantial deposits thereon. In tropical waters, it is not uncommon to find that under some conditions, a surface may be fouled in a period of one month or even less to a degree which seriously impairs its effectiveness.

Prior attempts to minimize or eliminate this problem by controlling the deposition and growth of these marine organisms have included use of certain paints which contained anti-fouling ingredients. The largest percentage of these paints have included various compounds of copper, typically cuprous oxide. Copper-containing anti-fouling paints have, however, been found to be less than fully satisfactory. For example, copper oxide-containing paints are not effective against many marine organisms including tubeworms, hydroids, etc. They are particularly ineffective against algae; and algae is one of the major causes of fouling. It is a further defect of certain prior art anti-fouling paints that they do not have any substantial life.

Among the other defects of prior art anti-fouling paints may be noted their high degree of pigmentation which minimizes the field of their use. It has not heretofore been possible to prepare a clear anti-fouling paint. Furthermore, prior art anti-fouling ingredients are heavy powders which must be finely ground and intimately mixed with the vehicle—even under the most favorable conditions, they will settle out. Prior art paints are also characterized by the fact that they are deactivated on contact with steel or aluminum surfaces; and they may promote galvanic corrosion.

It is an object of this invention to provide a novel anti-fouling composition. Another object of this invention is to provide a new technique for coating marine surfaces whereby they may be rendered resistant to fouling. Other objects will become apparent to those skilled in the art on inspection of the following description.

In accordance with certain aspects of this invention, the novel anti-fouling marine coating comprises an unsaturated paint base, a solvent, and an anti-fouling amount of an organotin compound $(R_3Sn)_yX$ wherein R is a lower alkyl group, the total number of carbon atoms in $R_3$ being 9–12; X is an anionic radical selected from the group consisting of a monovalent anionic radical selected from the group consisting of chloride, nitrate, hydroxide, acetate, octanoate, laurate, resinate, dimethyl dithiocarbamate, naphthenate, isooctylmercaptoacetate, hydride, and methoxide and a bivalent anionic radical selected from the group consisting of oxygen, chromate, and sulfate; y is 1 when X is monovalent and y is 2 when X is bivalent.

The unsaturated paint base from which the anti-fouling paint of this invention may be prepared may be a polymeric composition based upon a monomer which is unsaturated i.e. which contains at least one double bond. The base preferably may include a composition of the acrylic type or the vinyl type. Typical acrylic bases may include acrylates or methacrylate such as methyl methacrylate or ethyl acrylate, preferably polymerized in accordance with known techniques and mixed with an inert solvent such as mineral spirits or similar petroleum type derivatives. A typical acrylic resin solution which may be employed is the acrylic resin solution sold under the trademark Acryloid F–10 (40% solids). This composition may contain mineral thinner as a solvent. Typical vinyl bases may include polyvinyl chloride, polyvinyl alcohol, and polyvinyl acetate, preferably polymerized in accordance with known techniques to desired molecular weight and/or mixed with a solvent such as methyl isobutyl ketone, toluene, chlorobenzene, etc. A typical vinyl which may be employed is the vinyl copolymer sold under the trademark VAGH.

It is a feature of the anti-fouling paints of this invention that because of the cooperation between the paint base and the anti-fouling ingredient, they provide maximum coverage or protection while simultaneously permitting controlled exudation of the active anti-fouling ingredient to the exposed surface.

The active anti-fouling ingredients of this novel marine coating are the organotin compounds $R_3SnX$. The group R may be a hydrocarbon group. In the preferred embodiment, the total number of carbon atoms present in $R_3$ may be 9–12; i.e. $R_3$ may be tripropyl-; tributyl-; diethyl amyl-; dipropyl butyl-; etc. Preferably R will be a hydrocarbon group containing 3–4 carbon atoms. The preferred group is the butyl group $C_4H_9$.

The substituent X may preferably be an anionic radical selected from the group consisting of a monovalent anionic radical selected from the group consisting of chloride, nitrate, hydroxide, acetate, octanoate, laurate, resinate, isooctylmercaptoacetate, hydride, dimethyl dithiocarbamate, and naphthenate, and a bivalent anionic radical selected from the group consisting of oxygen, chromate, and sulfate. Other comparable or equivalent groups may be present. Preferably X may be oxygen. When X selected from the noted group is bivalent, e.g. oxygen, sulfur, chromate, sulfate, it is apparent that the formula $(R_3Sn)_yX$ will be $(R_3Sn)_2X$; typical of the latter type of compounds is bis(tri-n-butyltin)oxide, $[(C_4H_9)_3Sn]_2O$. In this case the number of carbon atoms in the $R_3$ may be 9–12.

Typical of the compounds which may fall within the scope of the formula $(R_3Sn)_yX$ may be bis(tri-n-propyltin)oxide, tri-n-propyltin chloride, tri-isopropyltin chloride, tri-isobutyltin chloride, bis(tri-n-butyltin)oxide, tributyltin acetate, tributyltin chloride, tributyltin laurate, tributyltin fluoride, tributyltin chromate, tributyltin maleate, amyl diethyltin chloride, butyl dipropyltin chloride, tributyltin hydride, tributyltin resinate, tributyltin isooctylmercaptoacetate tributyltin dimethyl dithiocarbamate, tributyltin nonanoate, and tributyltin naphthenate.

Typical of the solvents which may be employed to formulate the coatings of this invention may be hydrocarbon solvents including gasoline, naphtha, toluene, or mineral solvents; ketone type solvents typified by methylethylketone, methyl isobutyl ketone; chlorobenzene; etc.

Formulation of the anti-fouling marine coatings of this invention may be made by mixing the unsaturated paint base, the solvent, and the $(R_3Sn)_yX$. It is a particular feature of this invention that these triorganotin compounds are either liquid or low melting compounds and are readily miscible with or soluble in the other components of the coating; furthermore, in use they spew or exude to the surface of the coating over an extended period of time thereby contributing to the anti-fouling action.

The coating may include thickeners typified by bentonite; pigments typified by titanium dioxide; fillers typified by aluminum silicate or calcium silicate; driers typified by cobalt naphthenate or manganese naphthenate; etc.

A typical anti-fouling marine coating prepared according to this invention may possess the following formulation.

| Component: | Parts by weight |
| --- | --- |
| Titanium dioxide | 17.7 |
| Aluminum silicate | 5.3 |
| Fibrous talc | 1.2 |
| Acrylic resin solution (sold under the trademark Acryloid F–10 containing 40% solids) | 48.2 |
| Aromatic petroleum naphtha | 16.4 |
| Bis(tri-n-butyltin)oxide | 11.2 |

Another typical anti-fouling marine coating prepared according to this invention may possess the following formulation.

| Component: | Parts by weight |
| --- | --- |
| Titanium dioxide | 16.8 |
| Bentonite (sold under the trademark Bentone 18C) | 1.6 |
| Vinyl chloride-vinyl acetate copolymer (sold under the trademark VAGH) | 11.5 |
| Tricresyl phosphate | 1.2 |
| Toluene | 25.0 |
| Methyl isobutyl ketone | 33.3 |
| Bis(tri-n-butyltin)oxide | 10.6 |

Although it may be possible to effect considerable improvement in anti-fouling coatings by use of amounts of $(R_3Sn)_yX$ (for example, bis(tri-n-butyltin)oxide) as small as 6% of the solids or non-volatile contents of the paint (equivalent to about 2% of the total paint), preferred compositions will contain at least about 15%, and preferably 15%–25% $(R_3Sn)_yX$ on the basis of the non-volatiles. For example, the following tables note the performance of the hereinbefore noted preferred acrylic and vinyl paints. In each case, the entire composition except for the bis(tri-n-butyltin)oxide was held constant. A fouling rate of 100 is good; one of 0 is bad. As will be apparent from the following tables and data, the use of the noted anti-fouling amounts of the herein described compounds permits attainment of outstanding results.

Table I

ACRYLIC COATING

| Percent bis(tri-n-butyltin)oxide | Fouling Rating—Months | | | |
| --- | --- | --- | --- | --- |
| | 1 | 2 | 3 | 4 |
| 3.0 | 98 | 28 | 26 | 0 |
| 5.9 | 100 | 84 | 78 | 61 |
| 8.9 | 100 | 90 | 86 | 83 |
| 11.9 | 100 | 94 | 94 | 93 |
| 14.8 | 100 | 100 | 94 | 97 |
| 19.7 | 100 | 98 | 97 | 100 |
| 23.9 | 100 | 100 | 100 | 100 |

VINYL COATING

| 15.8 | 98 | 100 | 78 | 100 |
| --- | --- | --- | --- | --- |
| 26.1 | 100 | 100 | 90 | 100 |
| 36.1 | 100 | 100 | 82 | 100 |

STANDARD CUPROUS OXIDE PAINT CONTAINING 8 POUNDS $Cu_2O$ PER GALLON, BEST COMMERCIAL PAINT

| | 100 | 96 | 93 | 82 |
| --- | --- | --- | --- | --- |

It is a particular feature of this invention that superior anti-fouling results are attained when the coating is formulated so that the ratio of pigment to paint base is less than about 1.5. For example, a marine coating was prepared with the following composition.

| Component: | Parts by weight |
| --- | --- |
| Pigment, an equipart mixture of titanium dioxide and aluminum silicate | 27.81 |
| Acrylic resin solution (sold under the trademark Acryloid F–10 containing 40% solids) | 34.80 |
| Bis(tri-n-butyltin)oxide | 1.99 |
| Mineral spirits | 35.39 |

The resin content of this coating was held constant and the pigment content was varied. The coatings so prepared were painted (two coats) on test panels which were immersed below tide level in the sea at Miami Beach, Florida, in mid-winter. The panels were judged by the percentage of surface covered by fouling. The fouling rating is determined as 100 minus the percent covered by fouling, and thus a fouling rating of 100 is good. The following table shows the fouling ratings after various periods for coatings having various ratios of pigment to resin.

Table II

| Ratio of Pigment to Base | Fouling Rating—Days | | | | |
| --- | --- | --- | --- | --- | --- |
| | 21 | 30 | 47 | 52 | 59 |
| 0.5:1 | 100 | 100 | 100 | 100 | 100 |
| 1:1 | 100 | 100 | 98 | 93 | 93 |
| 2:1 | 100 | 98 | 46 | 21 | 4 |
| 3:1 | 100 | 87 | 0 | 0 | 0 |
| 4:1 | 100 | 90 | 0 | 0 | 0 |

From this table, it will be apparent that unexpectedly superior results may be obtained with the novel coatings of this invention when the ratio of pigment to paint base therein is maintained less than about 1.5:1.

It is also an unexpected feature of this novel invention that it permits attainment of a clear non-pigmented anti-fouling paint. For example, use of bis(tri-n-butyltin)oxide together with e.g. the vinyl vehicle of the hereinbefore noted example gives a transparent, clear anti-fouling coating.

It is a particular feature of the compositions of this invention that they permit control of all marine organisms including barnacles, algae, tubeworms, hydroids, oysters, bryozoans, tunicates. They are substantially free of color and thus can be used in a wide variety of systems. Because of the fact that many of the compounds $R_3SnX$ are liquids, they can be readily mixed with other components; the so-formed coatings do not need grinding nor will they settle on standing.

These coatings, in contrast to prior art copper-containing coatings, are not deactivated on contact with steel or aluminum; nor do they contribute to galvanic corrosion. Furthermore, thin coats of these compositions will prevent attack by marine borers (Toredo) and Limnoria.

Although this invention has been described with reference to specific examples, it will be apparent that various modifications may be made thereto which fall within the scope of this invention.

I claim:

1. An anti-fouling marine coating consisting essentially of an unsaturated paint base selected from the group consisting of acrylic paint bases and vinyl paint bases, a solvent, and at least 2% by weight of an organotin compound $(R_3Sn)_yX$ wherein R is a lower alkyl group, the total number of carbon atoms in $R_3$ being 9–12; and X is an anionic radical selected from the group consisting of a monovalent anionic radical selected from the group consisting of chloride, nitrate, hydroxide, acetate, octanoate, laurate, resinate, dimethyl dithiocarbamate, naphthenate, issooctylmercaptoacetate, hydride, and methoxide and a bivalent anionic radical selected from the group consisting of oxygen, chromate, and sulfate; and y is 1 when X is monovalent and y is 2 when X is bivalent.

2. An anti-fouling marine coating as claimed in claim 1 wherein in $(R_3Sn)_yX$ each of the R's is selected from the group consisting of hydrocarbon radicals having 3–4 carbon atoms.

3. An anti-fouling marine coating as claimed in claim 1 wherein the compound $(R_3Sn)_yX$ is present in amount of 15%–25% by weight of the non-volatile components of the coating.

4. An anti-fouling marine coating as claimed in claim 1 wherein the said coating contains a pigment in amount less than about 1.5 parts per part of unsaturated paint base.

5. An anti-fouling marine coating consisting essentially of an unsaturated paint base selected from the group consisting of acrylic paint bases and vinyl paint bases; a solvent; a pigment in amount by weight less than 1.5 times the amount of said unsaturated paint base; and an anti-fouling amount of an organotin compound $(R_3Sn)_yX$ wherein R is a lower alkyl group, the total number of carbon atoms in $R_3$ being 9–12; and X is an anionic radical selected from the group consisting of a monovalent anionic radical selected from the group consisting of chloride, nitrate, hydroxide, acetate, octanoate, laurate, resinate, dimethyl dithiocarbamate, naphthenate, issooctylmercaptoacetate, hydride, and methoxide and a bivalent anionic radical selected from the group consisting of oxygen, chromate, and sulfate; and y is 1 when X is monovalent and y is 2 when X is bivalent, said organotin compound being present in amount of about 15%–25% by weight of the non-volatile components of said coating.

6. The method of preparing an anti-fouling marine coating which comprises mixing together an unsaturated paint base selected from the group consisting of acrylic paint bases and vinyl paint bases, a solvent, and an anti-fouling amount of an organotin compound $(R_3Sn)_yX$ wherein R is a lower alkyl group, the total number of carbon atoms in $R_3$ being 9–12; and X is an anionic radical selected from the group consisting of a monovalent anionic radical selected from the group consisting of chloride, nitrate, hydroxide, acetate, octanoate, laurate, resinate, dimethyl dithiocarbamate, naphthenate, isooctylmercaptoacetate, hydride, and methoxide and a bivalent anionic radical selected from the group consisting of oxygen, chromate, and sulfate; and y is 1 when X is monovalent and y is 2 when X is bivalent.

7. The method of treating a surface to render it resistant to fouling which comprises applying to the said surface an anti-fouling marine coating containing an unsaturated paint base selected from the group consisting of acrylic paint bases and vinyl paint bases, a solvent, and an anti-fouling amount of an organotin compound $(R_3Sn)_yX$ wherein R is a lower alkyl group, the total number of carbon atoms in $R_3$ being 9–12; and X is an anionic radical selected from the group consisting of a monovalent anionic radical selected from the group consisting of chloride, nitrate, hydroxide, acetate, octanoate, laurate, resinate, dimethyl dithiocarbamate, naphthenate, isooctylmercaptoacetate, hydride, and methoxide and a bivalent anionic radical selected from the group consisting of oxygen, chromate, and sulfate; and y is 1 when X is monovalent and y is 2 when X is bivalent.

8. The anti-fouling marine coating of claim 5 wherein the organotin compound is bis(tri-n-butyltin)oxide.

9. The anti-fouling marine coating of claim 1 wherein the organotin compound is tributyltin resinate.

10. The anti-fouling marine coating of claim 9 wherein said tributyltin resinate is present in an amount of at least about 15% by weight of the non-volatile components of said coating.

References Cited by the Examiner

UNITED STATES PATENTS

| | | | |
|---|---|---|---|
| 2,957,785 | 10/60 | Leatherland | 106—15 XR |
| 2,970,923 | 2/61 | Sparmann | 106—15 |
| 3,081,175 | 3/63 | Waite et al. | 106—15 |

FOREIGN PATENTS 851,902  10/60  Great Britain.

ALEXANDER H. BRODMERKEL, *Primary Examiner.*

JOSEPH REBOLD, MORRIS LIEBMAN, *Examiners.*